United States Patent [19]

Fischer

[11] Patent Number: 4,672,635
[45] Date of Patent: Jun. 9, 1987

[54] CIRCUIT ARRANGEMENT FOR NOISE SUPPRESSION IN BINARY DATA SIGNALS IN A DIGITAL TRANSMISSION SYSTEM

[75] Inventor: Helmut Fischer, Munich, Fed. Rep. of Germany

[73] Assignee: Siemens Aktiengesellschaft, Berlin and Munich, Fed. Rep. of Germany

[21] Appl. No.: 837,001

[22] Filed: Mar. 6, 1986

[30] Foreign Application Priority Data

Mar. 7, 1985 [DE] Fed. Rep. of Germany ....... 3508136

[51] Int. Cl.$^4$ .................. H03K 5/153; H04B 1/12
[52] U.S. Cl. .................................. 375/76; 375/102;
  360/39; 307/358; 328/163
[58] Field of Search ............... 360/39, 40; 375/76,
  375/99, 102; 307/358, 360; 328/162, 163, 165;
  455/303, 305

[56] References Cited

U.S. PATENT DOCUMENTS 3,473,131 10/1969 Perkins ............................. 375/76
4,137,504 1/1979 Simmons ........................... 328/165
4,479,266 10/1984 Eumurian et al. ................. 375/76
4,535,294 8/1985 Erickson et al. .................. 307/358

FOREIGN PATENT DOCUMENTS 9927547 4/1981 European Pat. Off. .
2549966 5/1977 Fed. Rep. of Germany .
3322623 1/1985 Fed. Rep. of Germany .
34-7852 9/1959 Japan .

OTHER PUBLICATIONS

IBM Technical Disclosure Bulletin, vol. 15, No. 2, Jul. 1972, Ernisse et al., "Multiplexing Amplitude Pointer with Digital Data to Enhance Error Correction", pp. 643-645.
IBM Technical Disclosure Bulletin, vol. 20, No. 2, Jul. 1977, Luhrs et al., "Adaptive Equalization for Digital Recorder Readback Circuits", pp. 518-520.
Japanese application No. 55-44628 of Hideo Nishijima, "Noise Rejecting Circuit", vol. 6, No. 22 (P-101), Feb. 9, 1982.
"Applied Ideas", 8029 Electronic Engineering, vol. 54, (1982), Sep., No. 669, London, Great Britain, p. 24.

Primary Examiner—Benedict V. Safourek
Attorney, Agent, or Firm—Hill, Van Santen, Steadman & Simpson

[57] ABSTRACT

For suppressing faults in binary data signals, two circuit branches respectively allocated to one of the polarities of the data signals and each comprising an integrator element and a comparator are provided. The integrator elements, triggered by an edge change of the data signals into the allocated polarity, regardless of a following edge change, acquire the signal components of this polarity up to a prescribed threshold. In response to a corresponding output signal of the following comparator, both integration elements are reset in common. The comparator output signals are also supplied to the set or reset inputs of a bistable switch means which outputs the noise-deinfested data signals.

17 Claims, 4 Drawing Figures

CIRCUIT ARRANGEMENT FOR NOISE SUPPRESSION IN BINARY DATA SIGNALS IN A DIGITAL TRANSMISSION SYSTEM

BACKGROUND OF THE INVENTION

The invention relates to a circuit arrangement for noise suppression in binary data signals in a digital transmission system.

A plurality of digital transmission systems for a great variety of uses are known wherein the data in the form of binary signals are transmitted on the basis of one or more rigidly prescribed nominal bit clock frequencies. Produced by a great variety of causes, malfunctions can occur on the communication link, whereby high-frequency noise components superimpose on the transmitted data signals.

For example, a data processing system with digitally functioning magnetic tape recorder means as peripheral memories represents an example of such a data transmission system. In this use situation, malfunctions are attributed to the fact that, for example, dirty or worn tape material, or dirty or worn heads for recording are employed. The typical fault pattern in read signals of magnetic tape stores is based on a collapse of or glitch in the read signal amplitude in the region of an edge change, so that multiple edges then appear instead of a single signal edge. Such devices, moreover, also work with a high recording density and, given the high resolution of the system comprising the magnetic head and magnetic layer then required, brief noise pulses in the digitized read signal can also appear between more remote pulse edges.

The possibility is fundamentally available of eliminating such high-frequency malfunctions by techniques which take effect either in the frequency range or in the time range. To be included in the former form of noise suppression are all those known techniques wherein the more or less worn edges of the data signals are converted into optimally pronounced rectangular pulses with the assistance of passive filters and pulse shaping networks. However, limits are placed on the use of passive filters because distortions which are unavoidable are particularly unpleasant, especially in the aforementioned use situation since no clock is transmitted in addition to the data signals, but must first be recovered from the data signals. It is thus particularly critical that the nominal period for a bit cell can likewise fluctuate because of an allowable deviation of the momentary tape speed for the nominal value.

It is therefore frequently preferred to execute the noise suppression by means of techniques in the time range. The apparatuses known for this purpose are based on the fact that noise signal components are of very short duration in comparison to the useful signals. Noise signals are thus discriminated from useful signals on the basis of a significantly shorter pulse duration of the noise components. In other words, an identified edge change is only interpreted as an edge change in the useful signal when the polarity in the binary signal is also maintained after the lapse of a predetermined, short time span. This time span is selected somewhat longer than the duration of the longest possible noise signal.

In a known apparatus for the realization of this principle, the noise-infested binary data signals are supplied to a flip-flop circuit acting as a pulse shaper and are converted into signals having normal and inverted polarity. Each of the pulse trains obtained in such fashion is then further processed in parallel in a separate circuit branch. An integrator is provided in every circuit branch, which is initiated by a positive edge change so as to integrate the following pulse up until the appearance of the next successive negative edge. When a prescribed threshold is exceeded, the integrator emits an output pulse having a corresponding width which, for example, can then be differentiated. The differentiated signals of both circuit branches which are obtained are supplied to the set or reset inputs of a further flip-flop which outputs the noise-deinfested binary data signals at its output.

Obviously, this known circuit arrangement is in a position to effectively suppress faults, i.e. brief polarity changes, lying between remoter, actual edge changes of the binary data signal when the threshold evaluating the integrated data signal is prescribed high enough in order to effect a signal delay which is sure to be adequate for every fault. The behavior of this circuit arrangement, however, is more critical in view of faults of the binary data signal which appear in the region of an actual pulse edge. In every case, it is only the last of these multiple edges which is interpreted as a true edge in the binary data signal. This potentially leads to considerable distortions, and thus to difficulties in the recovery of the nominal bit clock.

SUMMARY OF THE INVENTION

It is an object of the present invention to create a circuit arrangement for noise suppression in binary data signals of the type initially cited which clearly eliminates both faults in the region of an edge change of the binary data signal as well as faults between remoter edges without the actual edge change in the binary signal being thereby too greatly delayed, i.e. without the data signals becoming excessively distorted.

Given a circuit arrangement of the type initially described, this object is achieved in accordance with the invention by providing first and second circuit branches each having an integration means and a comparator means connected thereto for comparing a momentary value at the integration means to a prescribed threshold. Control means are provided for deriving noise-deinfested binary data signals from output signals of the comparator means. The integration means is triggered by an edge change of the infested binary data signals in the allocated one signal polarity. The signal components having the allocated polarity are acquired regardless of a following edge change until the given threshold is reached. Subsequent thereto the connected comparator means each emit a corresponding output signal. The control means comprises a switch means and a bistable switch means. The switch means is triggered by each comparator means output signal for common resetting of both integration means into an initial status. The bistable switch means has set and reset inputs and to which each of the comparator output signals are respectively supplied as set or reset signals. The desired result is essentially determined by the operating mode of the integrating elements employed. Every integrating element is not, for instance, reset after every individual, short-duration pulse of a prescribed plurality, but rather holds the value reached with the trailing edge of such a pulse until the next leading edge of the next pulse having the same polarity appears, and then continues the integration. This integration event is continued until finally a prescribed threshold is reached.

In this manner, the two integrating elements compete with one another. Only one of the two integrating elements is activated in system-conditioned fashion in a digital transmission system, whereas the other is held unmodified in the momentary status. Given an appearance of multiple edges, therefore, only one of the two integrating elements will always reach an integration value first which corresponds to the predetermined threshold. At this point in time, this is interpreted as the appearance of an edge in the binary data signal and both integrating elements are reset in common into their initial status. Depending upon in which of the two circuit branches the threshold was reached, the bistable switch means provided at the output of the circuit is driven via its set or reset input. Only when the identified signal edge represents a true edge of the binary data signal does this drive also effect a switch-over of the switch means. Thus, multiple edges which appear in conjunction with a true edge change in the binary data signal are, so to speak, compressed, whereas brief collapses in the binary data signal between the pulse edges are completely filtered out.

When this circuit arrangement is fashioned in purely digital form, as recited in dependent claims as further developments of the invention, then it can be achieved that the circuit is again in a position to evaluate new, short-duration faults immediately after every edge which has been identified, i.e. after the resetting of the integration elements. Even extremely critical faults in the pulse curve of the binary data signals can thus be governed, and it is also possible to flexibly adapt the circuit arrangement to a great variety of uses.

Given a digital structure of the circuit, this applies not only in view of the practically inertia-free function of the integration elements due to the elimination of discharge time constants, but also applies for further possibilities of additional editing of the noise-deinfested binary data signals such as, for example, recognizing the direction of signal edges and keeping this information static until another directional inversion occurs. Thus, all preconditions for a following recovery of the bit clock from the pulse train of the binary signals can be created, if necessary.

DESCRIPTION OF THE PREFERRED EMBODIMENTS

Figure 1:
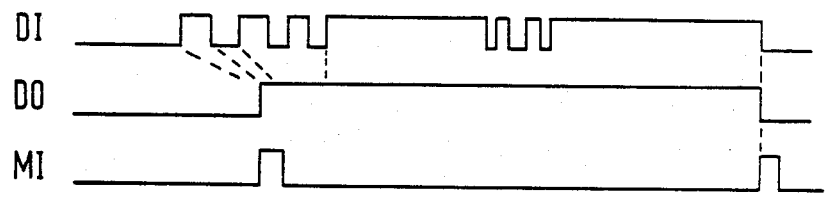
FIG. 1 illustrates pulse diagrams with a typical fault pattern in digitized read signals of a magnetic tape store as an example of noise-infested binary data signals and, in a schematic form, pulse diagrams for noise-deinfested binary data signals derived therefrom.

In order to illustrate this problem, pulse diagrams are schematically shown in FIG. 1, as an introduction. The first line shows a portion of the pulse train of noise-infested binary data signals DI, and which, with reference to use in magnetic tape recorders, shows a typical fault pattern for read data. As a result of faults in the digitized signal induced in the read signal, multiple edges can appear in the region of an edge change. A collapse in the data signal between the remoter edges is also typical. The second line of FIG. 1 shows the corresponding original binary data signal free of the faults and which is to be recovered from the noise-infested binary data signal DI as unmodified as possible with the assistance of a circuit arrangement for noise suppression. Finally, the third line shows mark pulses MI triggered by the edges of the binary data signal, these mark pulses MI being acquired from the noise-deinfested pulse train of the binary data signals DO and which, for example, are employed in a following recovery of the momentary bit clock which is not under discussion here.

FIG. 1 thus illustrates the following problem in a circuit arrangement for noise suppression in binary data signals. A possibility must be created for compressing such multiple edges in the region of an edge change of the binary data signal in order to recover the original edge with the best possible approximation. Also, collapses in the data signal between edge changes must be completely filtered out.

Figure 2:
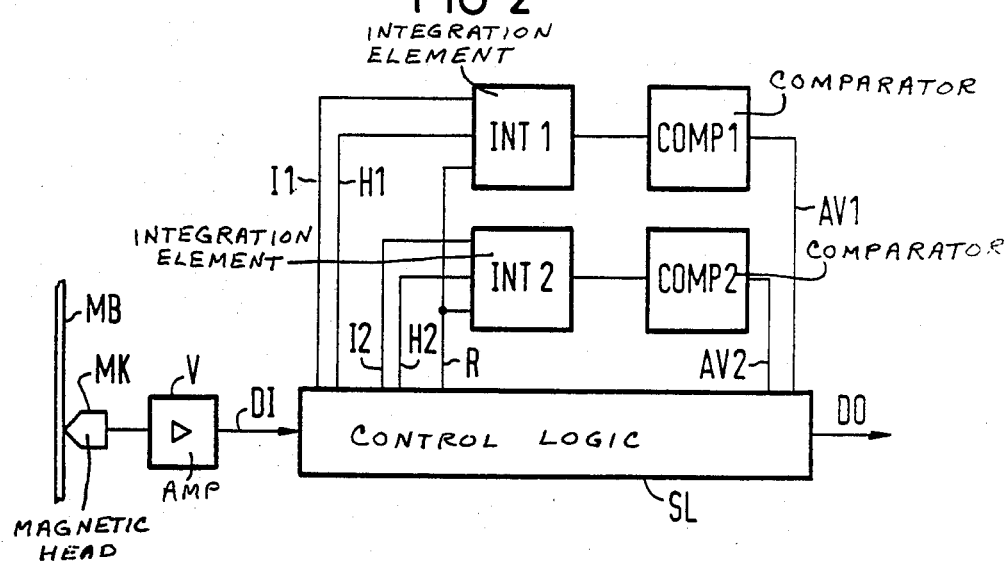
FIG. 2 illustrates a basic circuit diagram of a circuit arrangement of the invention for noise-deinfestation of binary data signals as shown in FIG. 1.

The block circuit diagram of a circuit arrangement with which this object is achieved is shown in FIG. 2. Given this circuit arrangement, data are read from a magnetic layer, for example from a magnetic tape MB, by use of a magnetic head MK. The signals which have been read contain the actual data information in coded form. They are amplified in an amplifier V and may be limited under certain conditions. Finally, they are digitized. The read operation and this signal editing are carried out in every magnetic tape recorder apparatus and can also be executed here with apparatus which is commercially available. A more detailed description of details is therefore superfluous.

Let the output signals of the amplifier V be the noise-infested binary data signals DI supplied to the circuit arrangement for noise suppression. In addition to a schematically shown control logic SL, this circuit arrangement contains two integration elements INT1 and INT2, and two comparators COMP1 and COMP2, each of which are connected to one of the integration elements. As indicated by appropriate input lines, the integration elements have three operating modes: "Integrating" —triggered by signals on the first input lines I1, I2; "Hold" —controlled by signals on the second input lines H1, H2; and "Reset" —triggered by a signal on the third input line referenced R. Each of the two comparators COMP1, COMP2 emit an output signal at output lines AV1 or AV2. These are supplied to the control logic SL and are processed there in order to generate the output signals, for example mark pulses MI, therefrom which correspond to the noise-deinfested binary data signals DO.

For a better understanding of the invention, it first seems meaningful to explain the function of this circuit arrangement shown schematically with reference to FIG. 2, and only then to describe details of the circuit structure with reference to a specific embodiment. The explanation of this function shall be carried out with reference to pulse diagrams shown in FIG. 3 wherein, however, transit time distortions which occur in practice are not taken into consideration for reasons of greater clarity. In order to properly relate the signal designations to FIG. 2, lower case designations have been selected, i.e. a signal y runs on a line Y.

Line (a) of FIG. 3 again shows an example of a pulse train of the noise-infested binary data signal DI over time t. In this pulse train, the noise-infested signal changes at a point in time t1. With this edge change, an integration signal i1 assumes the statue "1", as shown in line (h) of FIG. 3, and activates the first integration element INT1. A stored value A1 for the first integration element INT1 is specified thereto in line (c) of FIG. 3.

At point in time t2, the polarity in the noise-infested binary data signal DI changes again; the first integration signal I1 is thus reset into the status "0". At the same time, the first integration element INT1 is placed into the operating mode "hold" with the assistance of a first hold signal H1 (FIG. 3, line (i), its memory value A1 not changing in this operating mode. At the same point in time, the second integration element INT2 receives the second integration signal I2 (FIG. 3, line (j). The operating mode "Integrate" for the second integration element INT2 can be correspondingly taken from line (d) of FIG. 3 in which a momentary memory value A2 is shown.

At point in time t3, i.e. with the next, positive edge in the binary data signal DI, the status of the integration elements INT1 and, respectively, INT2 again reverses. The second integration signal i2 returns to "0", and instead, a second hold signal h2 (FIG. 3, line (k)) for this integration element is placed into the statue "1". The second integration element INT2 is thus in the operating mode "Hold", and the first integration element INT1 returns into the operating mode "Integrate".

This described, alternating operating mode of the two integration elements INT1 and INT2 is analogously continued at points in time t4 and t5 which again identify short-duration edge changes in the noise-infested, binary data signal DI. As may be seen, the two integration elements INT1, INT2 compete with one another in the region of these short-duration multiple edges and, in time, hold a higher and higher memory value A1 or A2. In the illustrated example, the first integration element INT1 reaches a memory value A1 at a point in time t6, this memory value A1 being identical to a permanently set threshold SW in the allocated, first comparator COMP1. The latter thereupon reports to the control logic SL that this status has been reached, and reports this with its output signal av1 which is shown in line (e) of FIG. 3.

Figure 3:
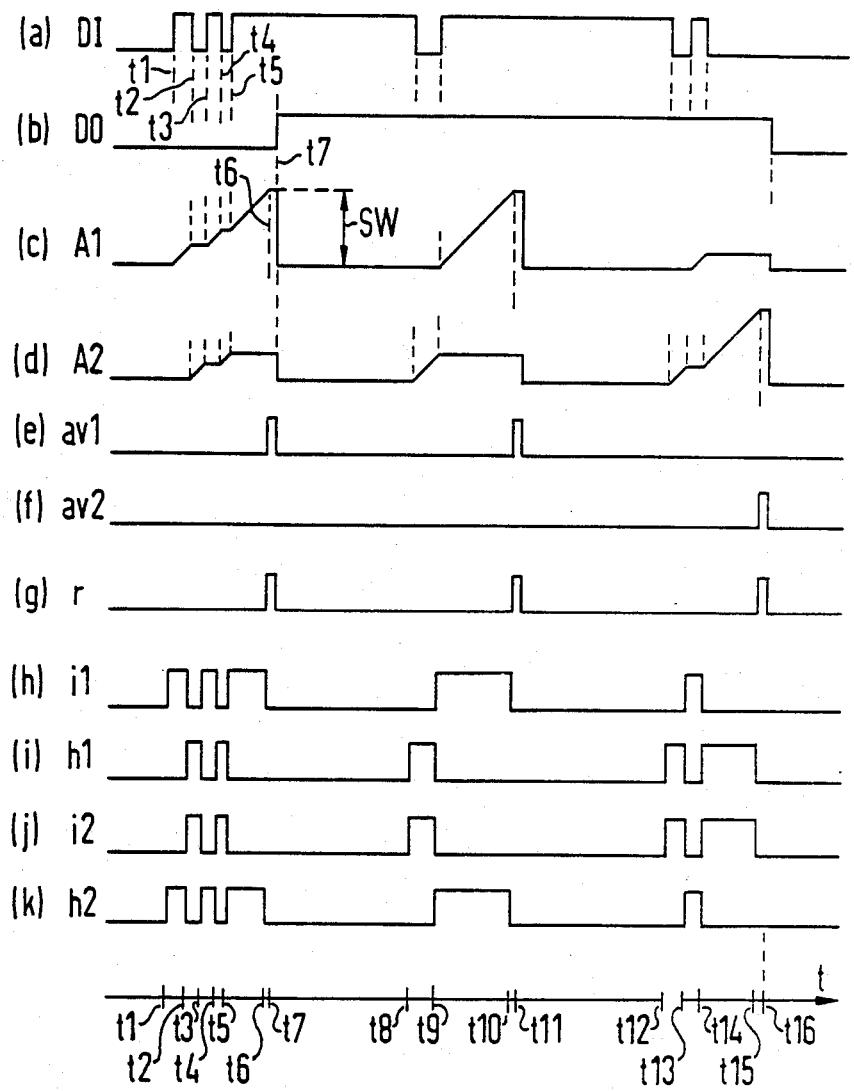
FIG. 3 illustrates a series of pulse diagrams for explaining the functioning of the circuit arrangement shown in FIG. 2.

From this output signal of the comparator COMP1, the control logic SL derives a reset signal r (line (g) of FIG. 3) and resets both integration elements INT1 and INT2. At the same time, the output signal av1 of the first comparator COMP1 is interpreted in the control logic SL as the reaching of an edge in the binary data signal. This means a polarity change for the noise-deinfested binary data signal, as shown in line (b) of FIG. 3. At this point in time t7, then both integration elements are again in the position to evaluate a new fault in the binary data signal DI.

Such a collapse or glitch in the binary data signal DI occurs at point in time t8 and lasts until point in time t9. Analogous to the above-described behavior of the integration elements INT1, INT2, the second integration element INT2 now begins to integrate first and is placed in the operating mode "Hold" at point in time t9. Instead, the first integration element INT1 begins to integrate with the trailing edge of the fault and again reaches the threshold SW at point in time t10. The corresponding output signal av1 of the first comparator COMP1 again triggers the afore-mentioned functions in the control logic SL, the short-duration collapse or glitch in the binary data signal DI being interpreted as a fault since no polarity change in the binary dta signal DI has appeared after the decay of this fault. Accordingly, the status of the noise-deinfested binary data signal DO shown in line (b) likewise does not change.

Multiple edges in the noise-infested binary data signal DI again occur at points in time t12 through t14. These are again evaluated by the integration elements INT1 and INT2 analogous to the operations set forth above. This time, the second integration element INT2 is the first to reach the permanently set threshold SW. Accordingly, the second comparator COMP2 emits an output signal av2 to the control logic SL. This again resets both integration elements INT1, INT2 and interprets the output signal av2 of the second comparator COMP2 as a polarity change in the binary data signal, as shown in line (b) of FIG. 3.

Figure 4:
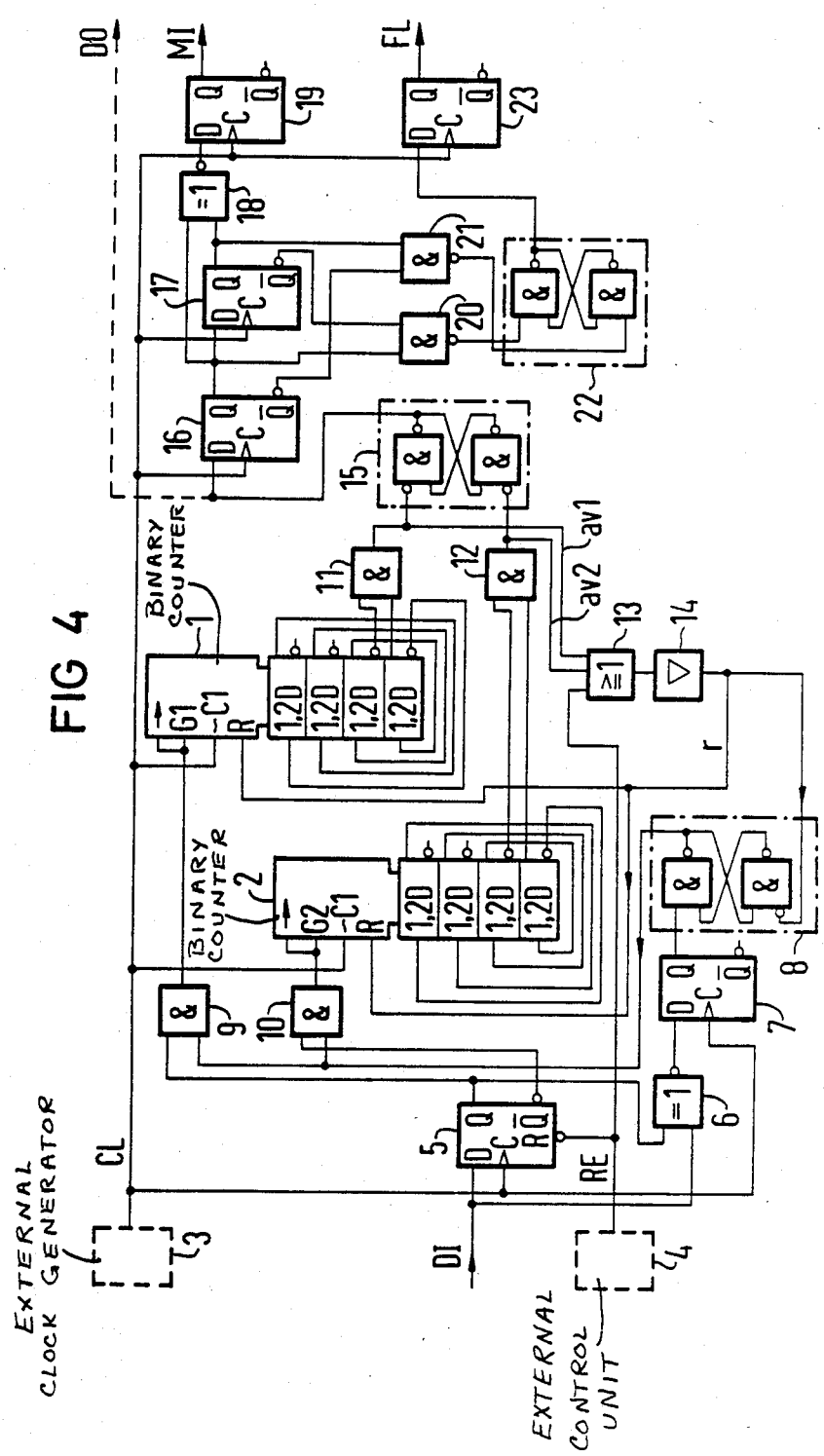
FIG. 4 illustrates the circuit diagram of an embodiment of the circuit shown in FIG. 2.

FIG. 4 shows an exemplary embodiment of the circuit arrangement shown schematically in FIG. 2. The function of one of the integration elements INT1 or INT2 with the comparator COMP1 or COMP2 connected thereto is realized in common by a respective first or second binary counter 1 or 2. The remaining circuit elements illustrated in FIG. 4 are all to be essentially assigned to the control logic SL.

As an external control signal, the circuit arrangement receives a clock signal CLOCK from an external clock generator 3 which is only shown schematically here, this clock signal, referenced CL in simplified fashion here having a frequency which corresponds to a multiple of the nominal bit clock of the binary data signals DI. How high this frequency is actually selected relative to the nominal bit clock of the binary data signals is a question of the circuit technology and of the given use. For, as shall become clear, this frequency, in collaboration with other measures, defines the dynamics of the circuit arrangement. It is further indicated in FIG. 4 that a further external control signal is supplied by a schematically indicated control means 4. This control signal is a general reset signal RESET and shall be referenced below with RE.

The noise-infested binary data signals DI are supplied to the data input of a first flip-flop 5 which is triggered by the clock signal CL. The data input D and one of the outputs of this flip-flop are respectively connected to corresponding inputs of an exclusive OR element 6 which thus always respectively emits an output signal when the status at the data input and data output of the first flip-flop 5 are not identical, i.e. when an edge change in the binary data signal DI has appeared within a clock period of the clock signal CL.

This status change is synchronized into the clock grid of the circuit arrangement with the assistance of a second flip-flop circuit 7. The output signal of this second flip-flop circuit 7 is supplied to a first RS flip-flop 8 which is thus set. This RS flip-flop can be arbitrarily constructed dependent on the circuit technology employed, and is realized here with the assistance of two NAND elements. The static output signal of the first RS flip-flop 8 is, in its status "1", an enable signal for the two binary counters 1, 2. It is supplied to two AND elements 9 and 10 in parallel which receive one of the mutually inverse output signals of the first flip-flop 5 at each of their second inputs. These output signals of the first flip-flop circuit 5 correspond, in their one status "1", to the integration signals I1 or I2 and, in their status "0" inverse thereto, correspond to the hold signals H1 and H2.

As schematically shown in FIG. 4, the two binary counters 1 and 2 are constructed in a known fashion as synchronous dual counters having a prescribed, maximum counter reading. Thus, the two binary counters 1, 2 can be realized as four-stage Johnson counters wherein a "1" at the data inputs is shifted through the individual stages under the control of the clock signal CL and is fed back to the input inverted as a carry. Given this circuit format, a binary "1" resides at the output of the fourth stage of the counter after the seventh counting pulse, and a binary "0" resides at the output of the third stage. In the given use, this is the maximum counter reading which then through-connects one of the further AND elements 11 or 12 following these binary counters 1 or 2.

Briefly summarized, a first edge change in the supplied, noise-infested binary data signal DI is thus recognized by the exclusive OR element 6, the first RS flip-flop 8 being thus set so that the output signals of the first flip-flop circuit 5 are connected through to the first and second binary counters 1 and 2. As long as binary "1" is at the binary counter 1 or 2 at the point in time of the triggering clock edge of the clock signal CL, this counter, for example the first binary counter 1, is incremented by a count value. Since the status which is inverse relative thereto must be present at the same point in time at the second binary counter 2, the count value of this counter remains unaltered. Triggered by the supplied, binary data signals DI, as set forth in detail at the outset, this is continued until the maximum counter reading is reached at one of the binary counters 1 or 2 and the allocated AND element 11 or 12 connects through. The output signals of these AND elements correspond to the output signals av1 or av2 which are evaluated in the parts of the control logic SL which are still to be set forth in detail.

This signal evaluation relates, first, to generating the reset signal R. For this purpose, the outputs of the two AND elements 11 and 12 are connected to the inputs of an OR element 13 to which the general reset signal ER emitted by the control means 4 is also supplied. A signal amplifier 14 is connected to the output of the OR element 13, the output of this signal amplifier 14 being in turn connected parallel to the reset inputs of the two binary counters 1 and 2 as well as to a reset input of the first RS flip-flop 8. The signal amplifier 14 thus always emits a control signal triggering the resetting of the two binary counters 1 and 2 and of the first RS flip-flop 8 when one of the two binary counters 1 or 2 has reached the prescribed maximum counter reading, or when the externally generated reset signal RE is supplied. In the latter instance, the overall circuit arrangement is brought into a defined initial condition in which the first flip-flop circuit 5 is additionally reset. Another edge change of the binary data signal DI appearing after the resetting of the two binary counters 1, 2 is immediately identified by the first exclusive OR element 6, and the sequence set forth above is again initiated.

The output signals av1, av2 of the two AND elements 11 and 12 are also evaluated in another form in the control logic. For this purpose, the two AND circuits 11, 12 are respectively connected to the set or to the reset input of a second RS flip-flop 15 constructed of NAND elements. This circuit detail now makes it clear what happens when, as shown in FIG. 3, a noise cluster in the binary data signal appears between points in time t8 and t9, this noise cluster being completely filtered out. Although the second binary counter 2 begins to count at point in time 58, in contrast to the first binary counter 1, it does not reach the prescribed threshold. At point in time t10, the maximum counter reading in the first binary counter has been reached and a setting pulse is again forwarded to the second RS flip-flop which was already previously set.

The opposite case is present when one considers the condition occurring in FIG. 3 at point in time t15. At this point in time, the second binary counter 2 reaches its maximum counter reading before the first binary counter 1, so that the AND element 12 connects through and a "1" is present at the reset input of the second RS flip-flop 15. The flip-flop is thus reset and a polarity change occurs at its output. The output of the second flip-flop 15 thus supplies a signal which corresponds to the deinfested binary data signal DO.

The further circuit elements contained in the control logic SL can serve the purpose of deriving data signals instead of the noise-deinfested binary data signals DO, these other data signals containing the same information per se but in a form which is better adapted to a further processing of the binary data signals in, for example, the recovery of the momentary bit clock. For this purpose, two further flip-flop circuits 16 or 17 triggered by the clock signal CL are situated in a series connection at the output of the second RS flip-flop 15. Both normal outputs of this third and fourth flip-flop circuit 16 or 17 are connected to inputs of a second exclusive OR element 18. Thus, an edge change in the deinfested binary data signal is identified. A corresponding output signal is supplied to a fifth flip-flop circuit 19 which, controlled by the clock signal CL, emits a mark pulse MI in response thereto such as shown in FIG. 1 without taking the signal delays into consideration.

Furthermore, the two outputs of the third flip-flop circuit 16 and the outputs of the fourth flip-flop circuit 17, which are inverse thereto, are respectively connected in pairs to the setting or reset input of a third RS flip-flop 22 via two NAND elements 20 or 21. This third RS flip-flop 22 thus is always set when the outputs of the third and fourth flip-flop circuit 16 and 17 connected to the NAND element 20 both have a signal status "1". This status corresponds to a positive edge change of the noise-deinfested binary data signal DO. The analogous case applies for the resetting of the third RS flip-flop 22. The status of this RS flip-flop therefore provides information regarding the direction of the hitherto most recent edge change in the deinfested binary data signal. In order to synchronize the output signal of this flip-flop circuit with the mark pulse MI, finally a sixth flip-flop circuit 23 triggered by the clock signal CL is provided, the data input thereof being connected to the output of the third RS flip-flop 22. Synchronous to the mark pulse MI, therefore a static edge signal FL is output at the output of the flip-flop 23, the signal status of this edge signal FL indicating the direction of that edge in the binary data signal which appeared most recently.

It is thus clear that the mark pulse MI in combination with the edge signal FL conveys the same information in a different form as the deinfested data signal DO generated at the output of the second RS flip-flop 15. It nonetheless has the advantage that the information regarding the direction of the most recently appearing edge is retained until the next edge change. The above description also makes it clear that the use of the flip-flop circuits 16, 17, and 19, 23 essentially serves the purpose of capturing the appearing signals in a clock grid and synchronizing them with one another.

The significance of the clock period of the clock signal CL in relationship to the momentary bit clock of the binary data signal is also clear in this context. The evaluation of edges in the noise-infested binary data signal lying relative to one another is all the more distinct the higher the ratio of these two clocks to one another. However, it is not necessary to exploit this dynamic of the circuit arrangement up to an upper limit possible on the basis of modern circuit technology since a certain limitation in the dynamics of the described circuit arrangement already suppresses extremely high-frequency noise components from the outset and other causes for a phase distortion in the binary data signal can be present which, as is known (for example, given the read signals of magnetic tape recorder means) can only be eliminated by a further signal processing with the assistance of control loops, not relevant here.

Although various minor changes and modifications might be proposed by those skilled in the art, it will be understood that I wish to include within the claims of the patent warranted hereon all such changes and modifications as reasonably come within my contribution to the art.

I claim as my invention:

1. A circuit arrangement for noise suppression in noise infested binary data signals in a digital transmission system, comprising:
   first and second circuit branches allocated to one of two polarities of said data signals;
   said first and second circuit branches each comprising an integration means and a comparator means connected thereto for comparing a momentary value at the integration means to a prescribed threshold;
   control means for deriving noise-deinfested binary data signals from output signals of said comparator means;
   said integration means being triggered by an edge change of the infested binary data signals in the allocated one signal polarity, and acquiring signal components having the allocated polarity regardless of a following edge change until a given threshold is reached, and subsequent thereto said connected comparator means each emitting a corresponding output signal;
   said control means comprising a switch means and a bistable switch means;
   said switch means being triggered by each comparator means output signal for common resetting of both integration means into an initial status; and
   said bistable switch means having set and reset inputs and to which each of the comparator output signals are respectively supplied as set or reset signals.

2. A circuit arrangement according to claim 1 wherein said integration means and said comparator means provided in each circuit branch each comprise a binary counter means having a given maximum counter reading.

3. A circuit arrangement according to claim 2 wherein each of said binary counter means are synchronous dual counters with internal return of a carry signal; respective first and second AND element means being provided for forming said respective comparator output signals; and said AND element means being respectively connected to two counter outputs of said binary counter means.

4. A circuit arrangement according to claim 2 wherein a common control clock line is provided in said control means, said common control clock line carrying a control clock also supplied to said binary counter means and having a clock period which corresponds to a multiple of a nominal clock period of said binary data signals.

5. A circuit arrangement according to claim 4 including a first bistable circuit means triggered by said control clock line in said control means for identification of an edge of said binary data signal; said first bistable circuit means receiving said binary data signals at its data input; and an exclusive OR element having a first of its two inputs connected to the data input and a second connected to a data output of said bistable circuit.

6. A circuit arrangement according to claim 5 including a second bistable circuit means triggered by said control clock line and having its data input connected to an output of said exclusive OR element and for emitting a control signal at its output for activation of said binary counter means.

7. A circuit arrangement according to claim 6 including a first RS flip-flop in said control means, a set input of said first RS flip-flop being connected to an output of said second bistable circuit means.

8. A circuit arrangement according to claim 7 wherein each of the two outputs of said first bistable circuit means is connected via respective third and fourth AND element means to the data input of the respective first and second binary counter means; and a control signal at said first RS flip-flop being supplied to said third and fourth AND element means in common via a respective further input thereof.

9. A circuit arrangement according to claim 7 wherein outputs of said first and said second AND element means are connected in common to a logic gate of said switch means having an OR combination function and whose output emits a reset signal connected to both binary counter means as soon as one of said two binary counter means has reached said given maximum counter reading.

10. A circuit arrangement according to claim 9 wherein said switch means includes an amplifier stage connected to follow said logic gate.

11. A circuit arrangement according to claim 9 wherein said reset signal is supplied both to said first and second binary counter means as well as to said first RS flip-flop for resetting into their initial status.

12. A circuit arrangement according to claim 2 wherein a holding stage designed as a second RS flip-flop is connected in said control means to said first and second binary counter means, said comparator means output signals being connected respectively to the set and reset inputs of said holding stage.

13. A circuit arrangement according to claim 12 wherein third and fourth bistable circuit means are connected to be triggered by said control clock line and are provided in said control means, said third and fourth bistable circuit means being connected in series, and being connected to an output of said holding stage; and first and second NAND gates connected via their inputs to two mutually inverse outputs of said third and fourth bistable circuit means so as to permit identification of a positive or negative edge in said deinfested data signal.

14. A circuit arrangement according to claim 13 including a third RS flip-flop, set and reset inputs thereof being respectively connected to the respective output of the respective first and second NAND gates so that a signal corresponding to a specific direction of the edge change is statically held at an output of said third RS flip-flop until a next signal edge is identified.

15. A circuit arrangement according to claim 14 including a further exclusive OR element having its inputs connected to mutually corresponding outputs of said third and fourth bistable circuit means following said holding stage so that a dynamic mark pulse is output as soon as a signal edge appears in said deinfested data signal.

16. A circuit arrangement according to claim 15 including fifth and sixth bistable circuit means connected to be triggered by said control clock line and whose data inputs are connected respectively to an output of said further exclusive OR element and said third RS flip-flop so that said edge signal at an output of the sixth bistable circuit means and said mark pulse at an output of said fifth bistable circuit means occur chronologically synchronized.

17. A circuit arrangement for noise suppression in noise infested binary data signals in a digital transmission system, comprising:

a first circuit branch allocated to a first of two polarities of said data signals and a second circuit branch allocated to a second of the two polarities;

said first and second circuit branches each comprising an integration means and a comparator means connected at an output of the integration means for comparing a momentary value at the integration means to a prescribed threshold;

control means for deriving noise-deinfested binary data signals from output signals of said comparator means;

said first and second branch integration means being triggered by an edge change of the infested binary data signals corresponding to the allocated signal polarity, and acquiring signal components having the allocated polarity regardless of a following edge change until a given threshold is reached, and subsequent thereto said connected comparator means each emitting a corresponding output signal; and said control means when triggered by each comparator means output signal, resetting both integration means into an initial status.

* * * * *